United States Patent
Grunnet et al.

(10) Patent No.: US 11,313,353 B2
(45) Date of Patent: Apr. 26, 2022

(54) CONTROLLING A WIND TURBINE USING CONTROL OUTPUTS AT CERTAIN TIME STAGES OVER A PREDICTION HORIZON

(71) Applicant: VESTAS WIND SYSTEMS A/S, Aarhus N (DK)

(72) Inventors: Jacob Deleuran Grunnet, Tranbjerg J (DK); Tobias Gybel Hovgaard, Ry (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 119 days.

(21) Appl. No.: 16/889,013

(22) Filed: Jun. 1, 2020

(65) Prior Publication Data
US 2020/0378359 A1    Dec. 3, 2020

(30) Foreign Application Priority Data

May 31, 2019   (EP) ..................................... 19177614

(51) Int. Cl.
*G05B 13/04*    (2006.01)
*F03D 7/04*     (2006.01)
*F03D 7/02*     (2006.01)

(52) U.S. Cl.
CPC .......... *F03D 7/0224* (2013.01); *F03D 7/024* (2013.01); *G05B 13/048* (2013.01); *F03D 7/045* (2013.01);
(Continued)

(58) Field of Classification Search
None
See application file for complete search history.

(56) References Cited

U.S. PATENT DOCUMENTS 8,105,029 B2 * 1/2012 Egedal .................... F03D 7/046
                                                      416/33
8,849,737 B1 * 9/2014 Engler .................... G06N 5/02
                                                      706/46
(Continued)

FOREIGN PATENT DOCUMENTS

WO      2019052617 A1    3/2019

OTHER PUBLICATIONS

Rolf Findeisen et al.: "Computational Delay in Nonlinear Model Predictive Control", IFAC The 2012 IFAC Workshop On Automatic Control in Offshore Oil and Gas Production, vol. 37, No. 1, Jan. 1, 2004 (Jan. 1, 2004), pp. 427-432.
(Continued)

*Primary Examiner* — Ninh H. Nguyen
*Assistant Examiner* — Jason G Davis
(74) *Attorney, Agent, or Firm* — Patterson + Sheridan, LLP (57) ABSTRACT

The invention provides a method for controlling a wind turbine. The method predicts behaviour of the wind turbine components for the time stages over a prediction horizon using a wind turbine model describing dynamics of the wind turbine, where the time stages include a first set of time stages from an initial time stage and a second set of time stages subsequent to the first set. The method determines control outputs, e.g. individual blade pitch, for time stages based on the predicted behaviour. The method then transmits a control signal to implement only the control outputs for each of the second set of time stages so as to control the wind turbine. Advantageously, the invention reduces both average and peak computational loads relative to standard predictive control algorithms.

16 Claims, 7 Drawing Sheets

(52) U.S. Cl.
    CPC ..... *F05B 2260/821* (2013.01); *F05B 2270/32* (2013.01); *F05B 2270/404* (2013.01); *G05B 2219/2619* (2013.01)

(56) References Cited

U.S. PATENT DOCUMENTS

| | | | |
|---|---|---|---|
| 9,625,928 B2* | 4/2017 | Hajimiragha | G05F 1/66 |
| 2012/0029892 A1* | 2/2012 | Thulke | G05B 17/02 |
| | | | 703/7 |

OTHER PUBLICATIONS

Chen W-H et al.: "Model predictive control of nonlinear systems: Computational burden and stability", IEE Proceedings D. Control Theory & Applications, Institution of Electrical Engineers. Stevenage, GB, vol. 147, No. 4, Jul. 24, 2000 (Jul. 24, 2000), pp. 387-394.
European Patent Office Extended European Search Report for Application No. 19177614.5-1205 dated Apr. 12, 2019.

* cited by examiner

CONTROLLING A WIND TURBINE USING CONTROL OUTPUTS AT CERTAIN TIME STAGES OVER A PREDICTION HORIZON

FIELD OF THE INVENTION

The present invention relates generally to a method for controlling a wind turbine and, in particular, to using model-based predictive control outputs at certain time stages over a prediction horizon to control one or more components of the wind turbine.

BACKGROUND

Predictive control methods are known to be used in association with wind turbine control technology, in particular to increase or maximise power output of a wind turbine and/or reduce or minimise loading on a wind turbine. Model predictive control (MPC) is one approach for providing wind turbine control. A predictive controller is provided with a wind turbine model function operating on a number of input variables, and control outputs are derived accordingly, in this case by optimisation.

MPC methods rely on solving optimisation problems online and in real time, and they can therefore have relatively high computational requirements. A common limitation of MPC methods is thus the amount of available computational power. This is particularly the case when the sampling time becomes very small and there is therefore a relatively limited time in which to solve the optimisation problem.

For a wind turbine MPC setup, and using the wind turbine model function, the behaviour of one or more wind turbine components may be predicted over a receding or prediction horizon that is divided into a number of time stages. Each time stage predicts the wind turbine behaviour a short amount of time ahead and cumulatively the time stages predict the wind turbine behaviour over the prediction horizon. In particular, the length of the first time stage is important.

In known receding horizons setups, the optimisation is run and the solution is implemented only for the initial or first time stage. Before the first time stage has passed, the optimisation problem needs to be resolved again in order that the first time stage result of the next optimisation may be applied.

One solution which can be applied is to use an open loop horizon. That is, the first N>1 time stage results from each optimisation are implemented before the optimisation is re-run (instead of only the first time stage result). This has the effect that the average computation effort is scaled by 1/N; however, the peak computational requirements remain the same as the optimisation problem still needs to be solvable in time corresponding to the length of the first time stage so that the result for this stage may be implemented.

It has been suggested to provide for individual pitch control of one or more wind turbine blades in an MPC approach to wind turbine control. One challenge in making such a provision is that a relatively high resolution of blade azimuthal angle is needed, which leads to a relatively short first time stage in the prediction horizon, and so results in relatively high computational demands.

It is against this background to which the present invention is set.

SUMMARY OF THE INVENTION

According to an aspect of the present invention there is provided a method for controlling a wind turbine. The method may comprise a step of predicting behaviour of one or more wind turbine components or systems for each of a plurality of time stages over a prediction horizon using a wind turbine model that describes dynamics of the one or more components or systems of the wind turbine. The method may include defining the wind turbine model. The plurality of time stages may comprise a first set of time stages from an initial time stage and a second set of time stages subsequent to the first set. The method may comprise a step of determining at least one control output for each of the plurality of time stages based on the predicted behaviour. The method may comprise a step of transmitting a control signal to implement only the at least one control output for each of the second set of time stages. Implementing at least one control output may therefore control operation of one or more wind turbine components. The method may comprise repeatedly executing one or more of the method steps.

The method may comprise a step of using the predicted behaviour in a cost function of the wind turbine model. The method may comprise a step of optimising the cost function to determine the at least one control output for the plurality of time stages.

The cost function may include a penalty parameter associated with the predicted behaviour to penalise deviation in operation of the wind turbine from the determined at least one control output for the plurality of time stages according to a previous execution of the method steps.

The penalty parameter may constrain only the at least one output for the first set of time stages.

The penalty parameter may constrain the first set of time stages to be equal to the determined at least one output for the second set of time stages according to a previous execution of the method steps.

The penalty parameter may be variable across the plurality of time stages. Optionally, the penalty parameter is largest at the initial time stage. Optionally, the penalty parameter decreases from the initial time stage across the prediction horizon.

The penalty parameter may be based on an available amount of computational resource.

A length of the first set of time stages may be based on a computation time to execute the method steps.

A length of the first set of time stages may be equal to a length of the second set of time stages.

A length of time between each execution of the method steps may be equal to a length of the first set of time stages.

A length of individual ones of the plurality of time stages may be variable or different from one another. A length of the initial time stage may be less than or equal to each of the other plurality of time stages.

The one or more components of the wind turbine may include one or more individual blades of the wind turbine. The at least one control output may include individual pitch control of the one or more individual blades.

A length of the initial time stage may be based on a predetermined or predefined resolution in azimuthal angle of the one or more individual blades.

According to another aspect of the present invention there is provided a non-transitory, computer-readable storage medium storing instructions thereon that when executed by a processor causes the processor to perform the method described above.

According to another aspect of the present invention there is provided a controller for a wind turbine. The controller may be configured to predict behaviour of one or more wind turbine components or systems for each of a plurality of time stages over a prediction horizon using the wind turbine model that describes dynamics of the one or more components or systems of the wind turbine. The plurality of time stages may comprise a first set of time stages from an initial time stage and a second set of time stages subsequent to the first set. The controller may be configured to determine at least one control output for each of the plurality of time stages based on the predicted behaviour. The controller may be configured to transmit a control signal to implement only the at least one control output for each of the second set of time stages. The controller may be configured to repeatedly execute one or more of the above steps.

According to another aspect of the present invention there is provided a wind turbine comprising a controller as described above.

BRIEF DESCRIPTION OF THE DRAWINGS

One or more embodiments of the invention will now be described by way of example with reference to the accompanying drawings, in which.

DETAILED DESCRIPTION

Figure 1:
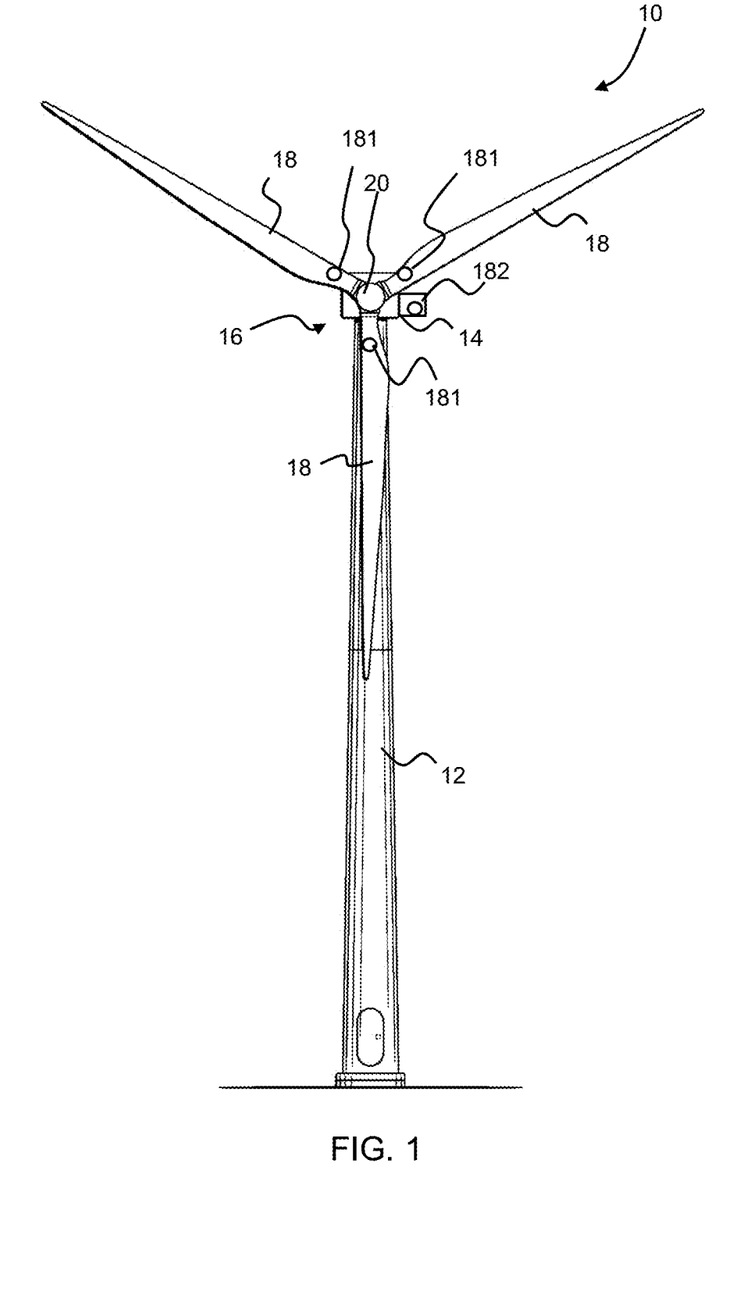
FIG. 1 shows a wind turbine according to an example of the invention.

FIG. 1 shows a wind turbine 10 in which an example of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18, although other configurations are possible.

Shown within each blade 18 is a blade load sensor 181 (in other examples there may be multiple blade load sensors allowing blade loads to be represented by more than a single variable). The sensing element may be a fibre optic strain gauge, a resistive strain gauge, or any other appropriate detector. A rotor wind speed detector 182 is also shown—again, this measurement may be performed in several ways as the skilled person will appreciate, one being through LIDAR as the skilled person will appreciate from the literature of wind turbine design and control.

Figure 2:
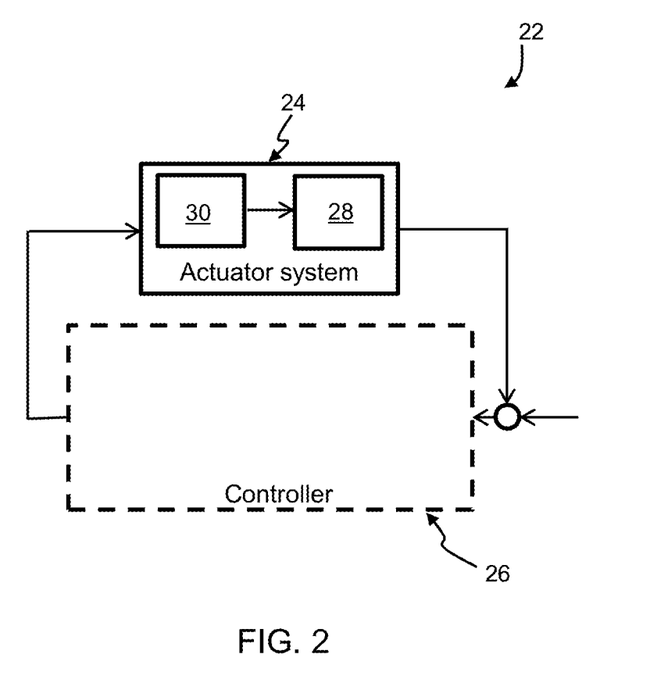
FIG. 2 shows a controller of the wind turbine of FIG. 1, and an actuator system of the wind turbine to be controlled by the controller.

FIG. 2 shows a wind turbine control system 22 in accordance with an example of the invention which may be implemented in the wind turbine 10 of FIG. 1. Here, the control system 22 includes an actuator system 24 that is controlled by a control unit or controller 26. In this particular embodiment, the actuator system 24 may be or comprise a pitch system for individually controlling the pitch of one or more of the wind turbine blades 18 which may include a hydraulic actuator 28 arranged to adjust blade pitch in a known manner. The actual position of the actuator 28 is controllable by an actuator position control unit 30 which provides a positioning command signal to the hydraulic actuator 28.

It should be appreciated that the controller 26 and actuator system 24 may be replicated for each of the blades 18 of the wind turbine 10 so that the position of each blade 18 may be controlled independently—in examples described here, this is done to provide individual pitch control for each blade.

It should be noted at this point that the pitch system of the wind turbine 10 is just one example of a wind turbine system that could be controlled and that the controller 26 could also be used to control other wind turbine systems and/or components. For instance, the actuator system 24 may be an electric or hydraulic yaw drive for the nacelle 14 of the wind turbine 10 to provide rotational position control of the nacelle 14 with respect to the tower 12. Another example would be a converter control system where the actuator system 24 may be a power converter of the generation system of the wind turbine 10 that converts AC power delivered by the generator to a variable-frequency AC power output via a DC link in a process known as 'full power conversion'. The skilled person would appreciate that the principle of the invention described herein could be applied to any wind turbine system or component that requires high speed real time control.

In one example method of the invention, the pitch of individual blades 18 in the wind turbine 10 may be controlled. In particular, wind speed may be determined as a function of azimuthal angle for different wind turbine blade positions. This information may be used to predict wind speed for an individual blade 18 over a prediction horizon. This may be provided as an input to a performance function or cost function. The cost function may then be optimised to control pitch of individual blades of the wind turbine 10.

More generally, one or more systems or components of the wind turbine 10 may be controlled. In particular, a wind turbine model describing dynamics of the one or more systems or components is defined. A number of input variables are estimated and/or measured, and the controller 26 uses the wind turbine model to predict the behaviour of the one or more systems or components over a prediction horizon. A cost function is then optimised to determine one or more control outputs over the prediction horizon, the control outputs being used to control operation of the wind turbine 10, e.g. to control the actuator system 24. The particular way in which the control outputs over the prediction horizon are implemented is described in greater detail below.

Figure 3:
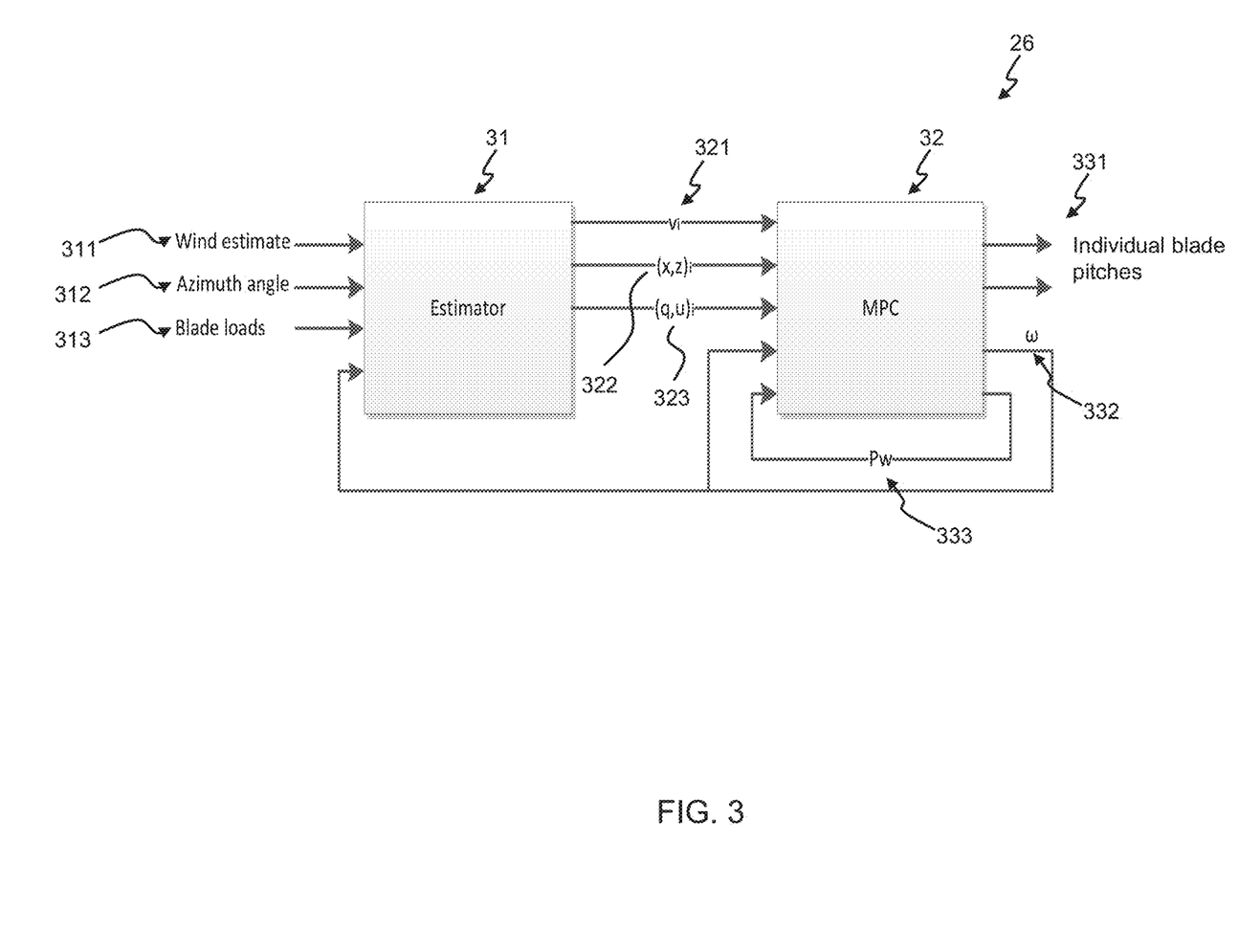
FIG. 3 shows component parts of the controller of FIG. 2, in particular an estimator unit and a model predictive control unit according to an example of the invention.

A specific example implementing this approach in the controller 26 is shown schematically in FIG. 3. Two functional elements are shown—an estimator unit 31 and a model predictive control unit 32. Both of these units may be provided by suitable software running on any suitable computing substrate using conventional or customer processors and memory. The estimator unit 31 and the model predictive control unit 32 may use a common computing substrate (for example, they may run on the same server) or separate substrates, or one or both may themselves be distributed between multiple computing devices.

For examples in which individual blade pitch is controlled, the estimator unit 31 receives as inputs a rotor wind estimate 311 and blade load values 313 for each blade with associated azimuth angles 312. A generator speed 332 derived as an output from the model predictive control unit 32 as a predicted trajectory over the prediction horizon is also fed back to the estimator unit 31. The outputs from the estimator unit 31 are local wind speeds 321 for each blade over a prediction horizon together with in-plane force components 322 and tilt and yaw force components 323 for each blade. The outputs from the estimator unit 31 are fed into the model predictive control unit 32 as inputs, together with the generator speed 332 and a rotor power 333 fed back from the model predictive control unit 32 output side. The model predictive control unit 32 provides pitch control 331 for each blade according to an optimisation result.

Figure 4:
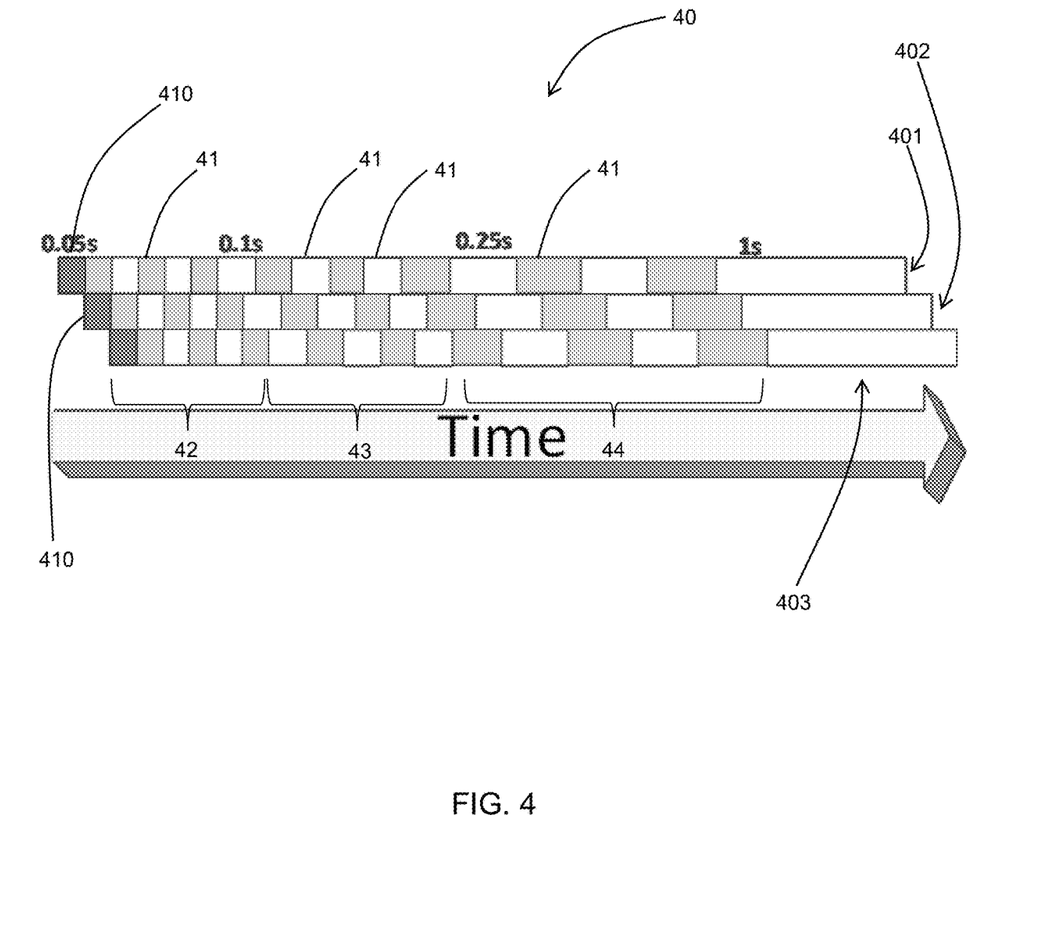
FIG. 4 schematically illustrates a moving prediction horizon of the controller of FIG. 2.

FIG. 4 schematically indicates an implementation of a prediction horizon or receding horizon 40 in the controller 26 according to a standard MPC setup. In particular, each horizontal row 401, 402, 403 schematically indicates the prediction horizon 40 at a particular snapshot in time along the time axis for a particular optimisation. The prediction horizon 40 is divided into a number of time stages 41, including an initial or current time stage 411. The controller 26 predicts the behaviour of the wind turbine system(s) and/or component(s) to be controlled using a wind turbine model describing the dynamics of the relevant systems or components. For instance, in the example above the wind turbine model includes dynamics of individual blades 18 of the wind turbine 10. Specifically, the controller 26 predicts the system behaviour at each time stage 41 so that, cumulatively, the system behaviour is predicted over the entire prediction horizon 40.

It is seen that the length of each of the time stages 40 is not constant over the prediction horizon 40. In particular, it is seen that the length of the time stages 41 increases along the horizon 40 away from an initial time stage 410, i.e. the initial time stage 410 is the shortest time stage 41. In the described example, the first few time stages 42 from the initial time stage 410 are all of equal, relatively short length. The subsequent few time stages 43 are also of equal length, but longer than the first few time stages 42, with the next few subsequent time stages 44 being equal to one another but longer than the previous time stages 43, and so on. The length of the time stages 41 is discussed in greater detail later.

With the system behaviour having been predicted at each time stage 41, the controller 26 performs an optimisation to determine a solution at each time stage 41, i.e. one or more control outputs for each time stage 41 over the prediction horizon 40. Referring to the first prediction horizon 401 in the example shown in FIG. 4, only the control outputs corresponding to the initial (first) time stage 410 (dark shading) are implemented by the controller 26. In particular, the control outputs for the subsequent time stages 41 (lighter shading and no shading) are not implemented by the controller 26. Instead, a current state of the system is sampled or estimated at the start of the initial stage 410 and the system behaviour is predicted at each stage 41 over the (new) prediction horizon 402, the controller 26 then optimising again over this prediction horizon 402. Again, only the control outputs corresponding to the initial (first) time stage 410 (dark shading) are implemented by the controller 26. Such an approach means that, for each optimisation, before the initial time stage 410 has elapsed, the optimisation problem needs to be solved again in order that the initial time stage 410 of the next optimisation may be applied, i.e. the determined or optimised control outputs for the initial stage 410 may be implemented by the controller 26. Such a scheme copes well with uncertainties in models and provides a robust control solution. However, it is clear that such an approach requires a relatively high amount of computational resource as the optimisation problem needs to be solved repeatedly over short time intervals, in particular repeated with a frequency corresponding to the initial time stage (which, in the described example is every 0.05 seconds).

Figure 5:
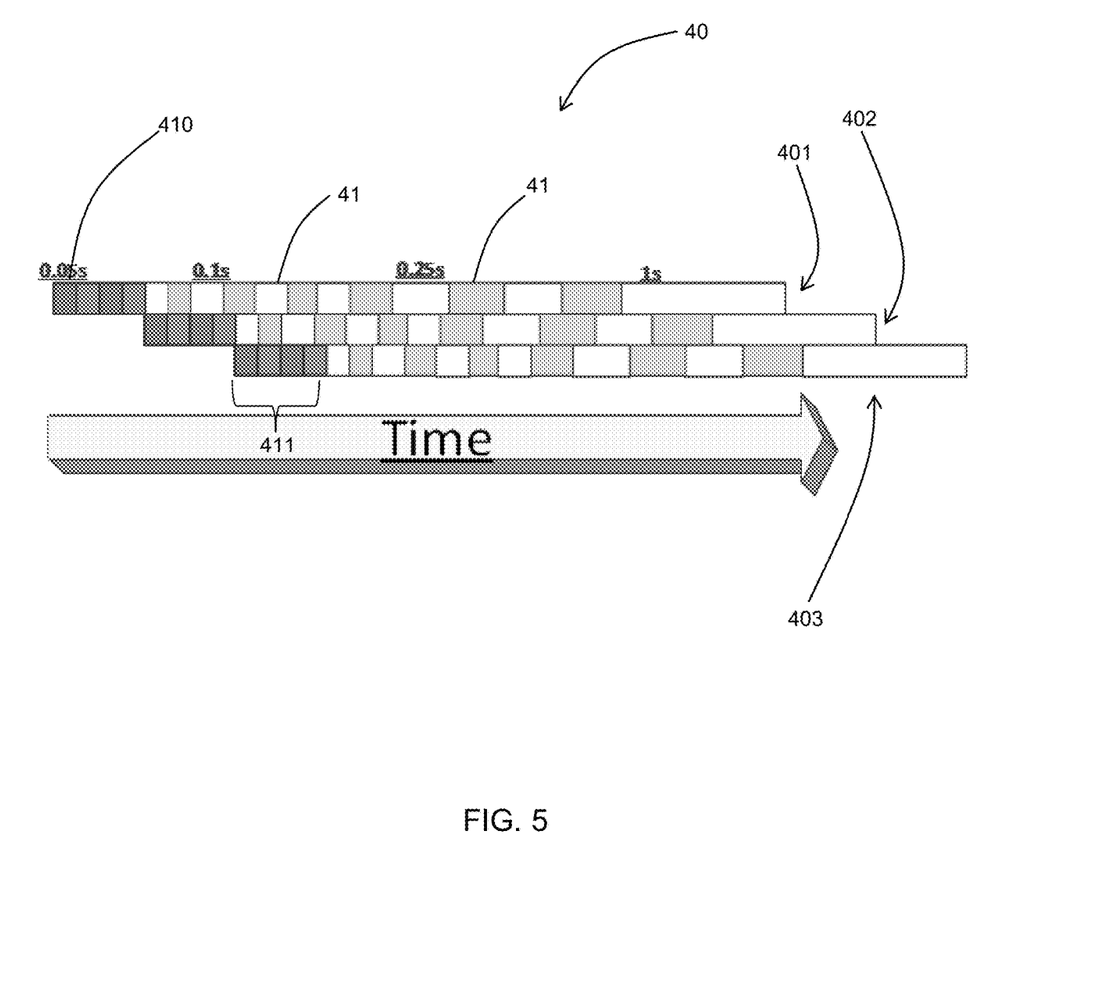
FIG. 5 schematically illustrates another moving prediction horizon of the controller of FIG. 2.

FIG. 5 schematically indicates a different implementation of the prediction or receding horizon 40 of FIG. 4. In particular, in this example the controller 26 implements the solution of the optimisation problem as an open loop horizon. Specifically, in contrast to the example in FIG. 4 in which only the control outputs for the initial time stage 410 are implemented, in the present example in FIG. 5 the control outputs for first or initial N>1 time stages 411 (dark shading) are implemented by the controller 26. In the example shown in FIG. 5, the open loop is run for the first four time stages 411, i.e. N=4. This reduces the frequency of how often the controller 26 needs to solve the optimisation problem. In particular, the controller 26 only needs to solve the optimisation problem with a frequency corresponding to the length of the first N>1 time stages 411 rather than a frequency corresponding to the length of the first time stage 410, as in FIG. 4. As such, the average computation effort needed by the controller 26 in the present example is scaled by 1/N. In the described example, the first N=4 time stages 411 are all of equal length; however, the open loop horizon may comprise time stages 41 of different length, in which case the scaling may be slightly different. Although this described example advantageously reduces the average computational resource needed to run the optimisation, the peak computational requirement remains the same as in the FIG. 4 example. This is because the controller 26 still needs to solve the optimisation problem in a maximum time corresponding to the length of the initial time stage 410. It may not be possible to simply increase the length of the initial time stage 410 as this may have an adverse effect on system accuracy.

Figure 6:
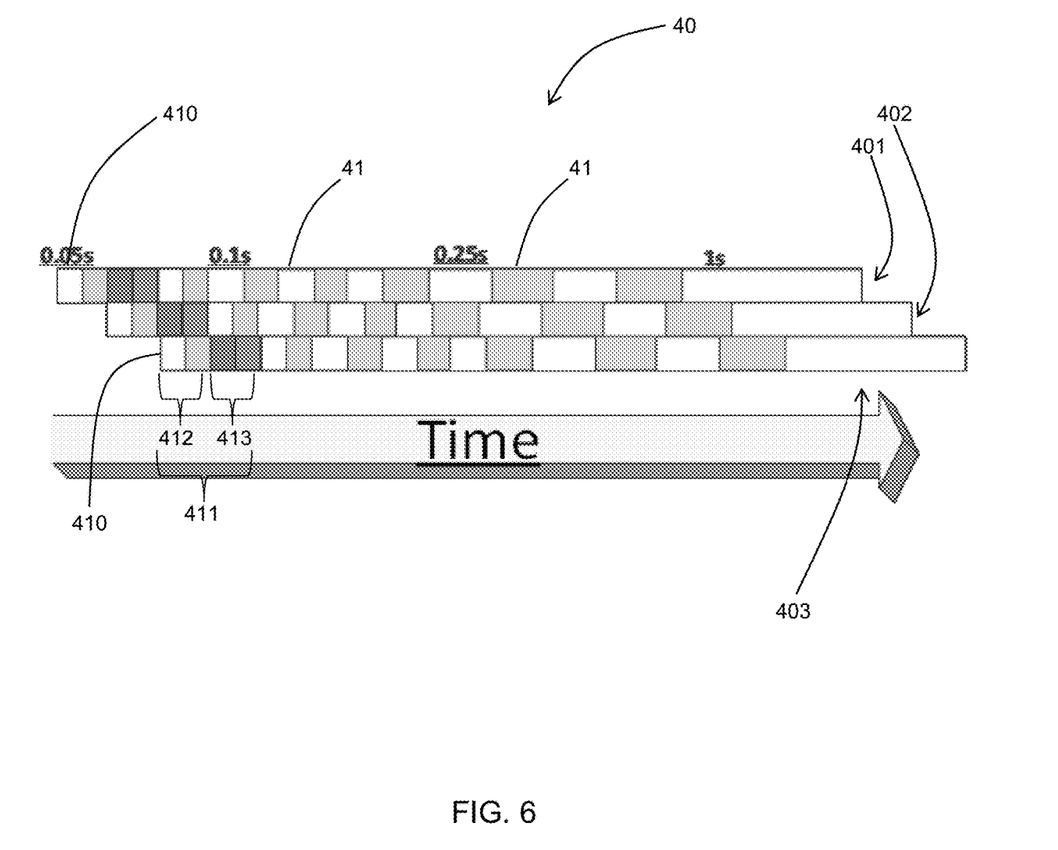
FIG. 6 schematically illustrates a further moving prediction horizon of the controller of FIG. 2; and, FIG. 7 outlines the method steps executed by the controller of FIG. 2 according to an example of the invention.

FIG. 6 schematically indicates a further different implementation of the prediction or receding horizon 40 of FIG. 4. Like in the FIG. 5 example, in this example the controller 26 implements the solution of the optimisation problem as an open loop horizon. However, unlike in the FIG. 5 example, although in this example the open loop is run for N>1 time stages 411, not all of the control outputs for these N>1 time stages 411 are implemented by the controller 26. Instead, the time stages 41 are considered to include a first set or group of time stages 412 and a second set or group of time stages 413, with only control outputs for the second set 413 being implemented. In particular, the N>1 initial time stages 411 comprise the first set of time stages 412 from the initial time stage 410, and the second set of time stages 413 (dark shading) is subsequent to the first set 412. In the described example, N=4, with the first set 412 including the first two time stages 41 and the second set 413 including the subsequent two time stages 413; however, any suitable number of time stages may be used in the first and second sets.

In contrast to the examples of FIGS. 4 and 5, in the present example in FIG. 6 the solution, i.e. the control outputs, for the initial time stage 410 is not implemented by the controller 26 to control the wind turbine 10. In fact, none of the control outputs for the time stages 41 in the first set 412 are implemented by the controller 26. Instead, as mentioned above, only the control outputs for the time stages 41 in the second set 413 subsequent to the first set 412 are implemented by the controller 26 to control the wind turbine 10. In the described example, this means that only time stages N/2 to N are implemented.

In the FIG. 6 example, the optimisation problem is therefore solved with a frequency corresponding to the length of the first set of time stages 412 which, in this particular example, is a frequency corresponding to the first two time stages 41. As the optimisation solution corresponding to the time stages 41 in the first set 412 are not to be implemented, then the controller 26 has a length of time corresponding to the length of the first set 412 in which to solve the optimisation problem. That is, instead of needing to solve the optimisation problem in a maximum time corresponding to the length of the initial time stage 410 (as in FIGS. 4 and 5), in the present example in FIG. 6 the optimisation problem may be solved in a maximum time corresponding to the length of the first set 412 of time stages 41 (which is longer than the length of the initial time stage 410). Advantageously, this reduces the peak computational requirement of the controller 26, which may allow more complex optimisation problems to be solved. In the described example, the maximum allowable solver runtime is $T=T_s N/2$, where $T_s$ is the length of the initial stage 410, and the peak computational requirement scales with 2/N.

FIG. 6 shows that there is an overlap in time between the implemented solutions from one optimisation, i.e. the solutions for the second set 413 of time stages 41, and the solutions for the first set 412 of time stages 41 for the following optimisation. As the optimisation is not being solved at every time step, then there is a greater chance of the initial conditions changing by a significant amount between each solve of the optimisation problem. As such, the overlapping implemented solutions 413 from one optimisation and the solutions from the first set 412 of the following optimisation may be different, thereby resulting in incongruence. This may be addressed by adding constraints to the determined control outputs for the first set of time stages 412 for each optimisation, i.e. the solutions that are not to be implemented by the controller 26. For instance, the control outputs for the first set of time stages 412 may be constrained to be equal to the implemented solutions 413 from the previous optimisation.

There are, however, various different ways in which the optimisation solutions may be constrained in order to ensure compatibility of solutions between consecutive solves of the optimisation problem. In the cost function to be optimised, a penalty parameter may be included that penalises deviation from the solution of the previous optimisation. In particular, the penalty parameter is associated with the predicted behaviour to penalise deviation in operation of the wind turbine 10 from the determined control outputs for the time stages 41 over the prediction horizon 40 according to the previous execution of the optimisation. The penalty parameter may include weights associated with some or all of the time stages 41. For instance, the penalty parameter may be such that the control outputs for the first set of time stages 412 are constrained to be equal to the implemented solutions 413 from the previous optimisation, as mentioned above. As another example, the penalty parameter may vary across different time stages 41 over the prediction horizon 40. For example, the penalty parameter may be such that the deviation penalty is largest or greatest at the initial time stage 410, i.e. the penalty for deviation is most severe at the initial time stage 410, with the penalty decreasing for each subsequent time stage 41 over the prediction horizon 40. In some examples, the penalty parameter is applied only to solutions for the first set 412 of time stages 41. In these examples, the deviation penalty may vary across each individual time stage 41 in the first set 412, e.g. the deviation penalty decreases from the initial time stage 410 across the prediction horizon 40.

As described above, the example illustrated in FIG. 6 allows a longer period in which to solve the optimisation problem, i.e. the length of the first set 412 rather than the length of the initial time stage 410. However, the length of the first set 412 still needs to be at least as long as the worst case runtime, i.e. longest possible runtime, to solve the optimisation problem. In many cases, the time taken to solve the optimisation problem may be significantly less than the length of the first set of time stages 412. This means that the open loop horizon may be left running for extended periods of time, in particular often unnecessarily long periods of time. It is undesirable to have the control loop running for extended periods of time as this may have an adverse effect on the system accuracy.

One option is to run the optimisation algorithm as fast as the available computational resource allows. In particular, whenever one optimisation run is completed, the next optimisation is initiated and the solutions from the just completed optimisation are implemented by the controller 26. This means that length of both the first and second sets of time stages 412, 413 are variable in dependence on the available level of computational resource. Advantageously, in such a case the controller 26 does not run open-loop longer than is necessary while still also ensuring that it has sufficient time to solve the optimisation problem.

In some examples, a penalty parameter that gradually decreases from the initial time stage 410 across the prediction horizon 40 will ensure that consecutive runs of the optimisation problem do not deviate significantly in the near term while leaving the controller 26 to adjust the implemented control actions or trajectories, as needed. The penalty parameter may generally vary in dependence on the computational resource that is available to solve the optimisation problem. For instance, if the amount of available computational resource is relatively small, e.g. resources are being used to perform other processing tasks, then the penalty parameter may be relatively large. In contrast, if the amount of available computational resource is relatively large, then the penalty parameter may be relatively small. A variable penalty or weighting parameter of this type has the effect of adjusting the allowable deviation between successive solutions of the optimisation problem in dependence on how long the open loop is likely to run for.

Figure 7:
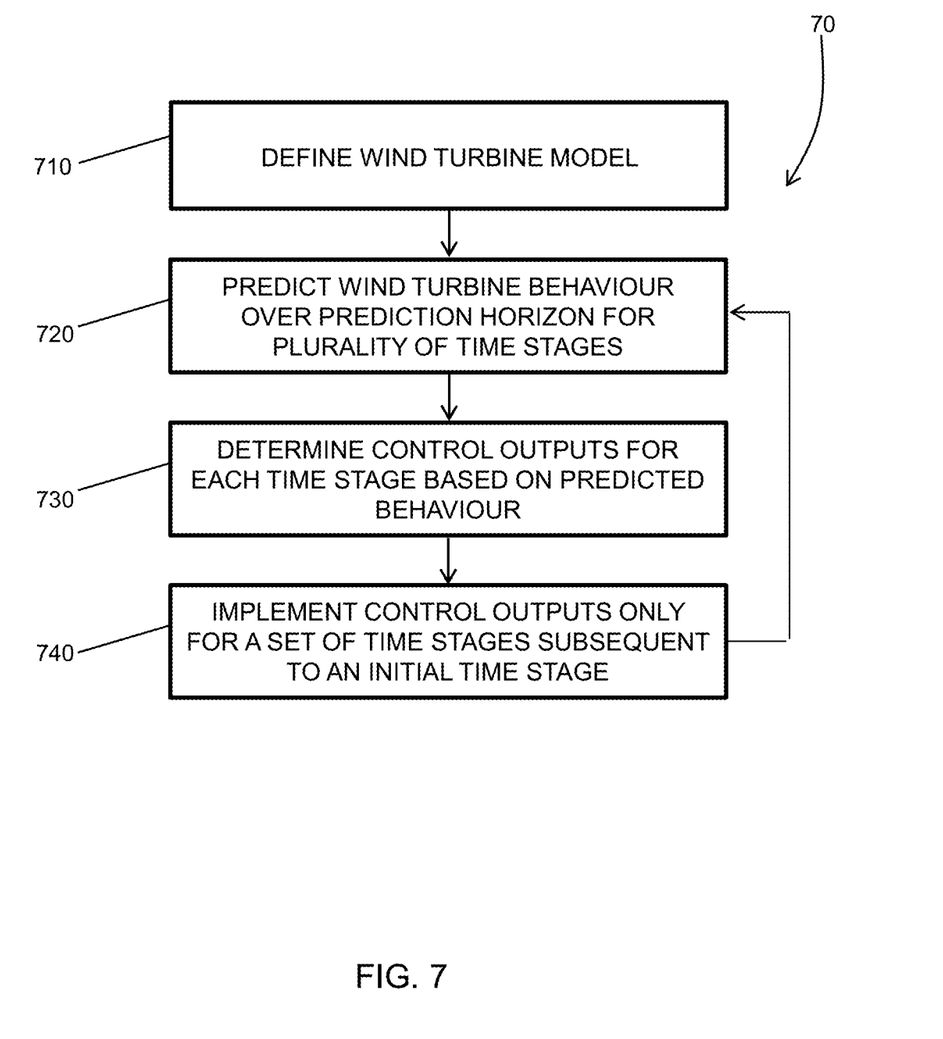

FIG. 7 summarises the steps of a method 70 performed by the controller 26 according to an example of the invention. At step 710 a wind turbine model describing dynamics of one or more components of the wind turbine 10 is defined. In particular, the components of the wind turbine to be controlled include one or more individual blades 18, specifically to individually control pitch of the blades 18.

At step 720, the controller 26 predicts the behaviour of the wind turbine components for each of the plurality of time stages 41 over a prediction horizon 40 using the wind turbine model. In particular, the controller 26 predicts trajectories of one or more variables of the turbine model over a prediction horizon based on received input values for each of a finite number of time steps from a current time step. The input values in the described example include the a wind speed estimate 311, azimuthal angle 312 and blade loads 313, together with predicted rotor speed 332 from a previous solve of the optimisation problem. The plurality of time stages 41 comprises a first set of time stages 412 from an initial time stage 410 and a second set of time stages 413 subsequent to the first set 412.

At step 730, the optimisation problem is solved in the MPC module 32 to determine the optimal trajectories of the system variables based on the objectives and constraints of the optimisation. In particular, control outputs for controlling the wind turbine 10 that will result in the optimal trajectories are determined. That is, the controller 26 determines at least one control output 331 for each of the plurality of time stages 41 based on the predicted behaviour.

At step 740, the controller transmits a control signal to implement only the control outputs 331 for each of the second set of time stages 413 so as to control the wind turbine 10. Steps 720, 730 and 740 are then repeated, for example with a frequency corresponding to the length of the first set of time stages.

Embodiments of the present invention are advantageous for use in control methods needing a high resolution in one or more measured or estimated input variables to ensure accuracy of the system. For instance, in the example of individual blade control a relatively high resolution in azimuthal angle of the blades is needed for system accuracy. This means that the current state of the system needs to be sampled with a high frequency, leading to a short initial time stage. However, there are no system dynamics operating on this time scale and so it is advantageous to run the optimisation open loop to reduce the average computation load, and to implement only the control outputs for some of the time stages 41 subsequent to the initial time stage 410 so as to reduce the peak computational load.

The invention claimed is:

1. A method for controlling a wind turbine, the method comprising:
    predicting behaviour of one or more wind turbine components for each of a plurality of time stages over a prediction horizon using a wind turbine model that describes dynamics of the one or more wind turbine components, the plurality of time stages comprising a first set of time stages from an initial time stage and a second set of time stages subsequent to the first set;
    determining at least one control output for each of the plurality of time stages based on the predicted behaviour; and
    transmitting a control signal to implement only the at least one control output for each of the second set of time stages.

2. A method according to claim 1, further comprising using the predicted behaviour in a cost function of the wind turbine model; and, optimising the cost function to determine the at least one control output for the plurality of time stages.

3. A method according to claim 2, wherein the cost function includes a penalty parameter associated with the predicted behaviour to penalise deviation in operation of the wind turbine from the determined at least one control output for the plurality of time stages according to a previous execution of the predicting, determining, and transmitting.

4. A method according to claim 3, wherein the penalty parameter constrains only the at least one control output for the first set of time stages.

5. A method according to claim 3, wherein the penalty parameter constrains the first set of time stages to be equal to the determined at least one control output for the second set of time stages according to a previous execution of the predicting, determining, and transmitting.

6. A method according to claim 3, wherein the penalty parameter is variable across the plurality of time stages, wherein the penalty parameter is largest at the initial time stage.

7. A method according to claim 3, wherein the penalty parameter is based on an available amount of computational resource.

8. A method according to claim 1, wherein a length of the first set of time stages is based on a computation time.

9. A method according to claim 1, wherein a length of the first set of time stages is equal to a length of the second set of time stages.

10. A method according to claim 1, wherein a length of time between each execution of the method is equal to a length of the first set of time stages.

11. A method according to claim 1, wherein a length of individual ones of the plurality of time stages is variable.

12. A method according to claim 1, wherein the one or more wind turbine components includes one or more individual blades of the wind turbine, and wherein the at least one control output includes individual pitch control of the one or more individual blades.

13. A method according to claim 12, wherein a length of the initial time stage is based on a predetermined resolution in azimuthal angle of the one or more individual blades.

14. A controller for a wind turbine, comprising:
    an input/output interface;
    a memory containing instructions; and
    a processor communicatively coupled to the memory and programmed by the instructions to perform an operation, comprising:
        predicting behaviour of one or more wind turbine components for each of a plurality of time stages over a prediction horizon using a wind turbine model that describes dynamics of the one or more wind turbine components, the plurality of time stages comprising a first set of time stages from an initial time stage and a second set of time stages subsequent to the first set;
        determining at least one control output for each of the plurality of time stages based on the predicted behaviour; and,
        transmitting a control signal to implement only the at least one control output for each of the second set of time stages.

15. A wind turbine, comprising
    a tower;
    a nacelle disposed on the tower;
    a rotor extending from the nacelle and having a plurality of blades disposed on a distal end; and
    a controller configured to perform an operation, comprising:
        predicting behaviour of one or more wind turbine components for each of a plurality of time stages over a prediction horizon using a wind turbine model that describes dynamics of the one or more wind turbine components, the plurality of time stages comprising a first set of time stages from an initial time stage and a second set of time stages subsequent to the first set;
        determining at least one control output for each of the plurality of time stages based on the predicted behaviour; and,
        transmitting a control signal to implement only the at least one control output for each of the second set of time stages.

16. The wind turbine of claim 15, wherein the one or more wind turbine components includes the plurality of blades, and wherein the at least one control output includes individual pitch control of the plurality of blades.

* * * * *